United States Patent [19]
Vaillancourt et al.

[11] 3,719,737
[45] March 6, 1973

[54] METHOD OF MAKING A PREFORMED CURVED EPIDURAL CATHETER

[75] Inventors: Vincent L. Vaillancourt, Livingston, Thomas H. Bohner, Berkely Heights, both of N.J.

[73] Assignee: C. R. Bard Inc., Murray Hill, N.J.

[22] Filed: Dec. 9, 1970

[21] Appl. No.: 96,593

Related U.S. Application Data

[63] Continuation of Ser. No. 822,677, May 7, 1969, abandoned.

[52] U.S. Cl. ............... 264/162, 128/349 R, 264/285, 264/292, 264/296
[51] Int. Cl. ............................ B28b 11/10, B29c 17/02
[58] Field of Search ...... 264/127, 162, 285, 292, 296; 128/349 R

[56] References Cited

UNITED STATES PATENTS

| | | | |
|---|---|---|---|
| 3,228,894 | 1/1966 | Jeckel | 128/349 R X |
| 2,941,911 | 6/1960 | Kumnick et al. | 264/127 X |
| 2,998,985 | 9/1961 | Burns et al. | 264/295 |
| 2,642,625 | 6/1953 | Peck | 264/127 X |
| 3,085,290 | 4/1963 | Chu | 264/127 |

FOREIGN PATENTS OR APPLICATIONS 6,511,556  3/1966  Netherlands ................ 264/127

*Primary Examiner*—Philip E. Anderson
*Attorney*—W. Saxton Seward

[57] ABSTRACT

A length of polytetrafluoroethylene tubing is passed over a rigid curved mandrel and then heated to a temperature above approximately 620°F to cause the tubing to become clear. The tubing is rapidly cooled to cause the tubing to set in a curved shape. The tubing is then removed from the mandrel and permitted to stabilize. A portion of the tubing adjacent an end is then stretched and the end of the stretched portion trimmed to form a curved catheter.

5 Claims, 6 Drawing Figures

PATENTED MAR 6 1973 3,719,737

INVENTORS,
V. L. VAILLANCOURT
BY THOMAS H. BOHNER

Nolte and Nolte
ATTORNEYS

METHOD OF MAKING A PREFORMED CURVED EPIDURAL CATHETER

This application is continuation of application Ser. No. 822,677, filed May 7, 1969 and now abandoned.

In order to bend a plastic (e.g. "Teflon") epidural catheter to a desired set curvature, a plastic tube is passed loosely over a rigid mandrel of the generally desired shape, the portion to be curved is heated, the heated tubing is stretched to draw down its diameter and effect at least partial orientation as well as attenuation, the tubing is cut to the desired length and the mandrel is removed. The curved catheter may be placed on a straight mandrel to be externally tipped by grinding to form a tapered end.

When a plastic catheter is inserted, with the aid of a needle, in the epidural space it is desirable to have the tip portion of the catheter angled with respect to the axis of the needle in order that it may lie in the space, after withdrawal of the needle, with its open end extending in the proper direction and in a position such that danger of obstruction to flow is minimized. An angle greater than 30° is found to be satisfactory.

Many crystalline plastic materials can be given a semi-permanent set (of varying durability) by merely holding the article in or beyond its desired deformed position for an extended period of time and efforts have been made to lock in such deformations by heating the article, but it has been found that, with or without heating, the inherent memory of most plastics causes a more or less gradual return to the original form unless the plastic is quenched (quickly cooled). This is intolerable in articles which may be used at times from a few days to several months after manufacture, the actual form of each article being a function of an unknown shelf time, and possible other factors. If the crystalline plastic is quenched, it warps and distorts rendering it unusable for many purposes.

For use in connection with epidural operations a preferred catheter material is "Teflon" TFE and the present invention will be described with particular reference to this material, but without restriction except as expressly noted. A catheter needle assembly in which the catheter disclosed herein may desirably be used as described in Henkin application Ser. No. 655,513, filed July 24, 1967, now U.S. Pat. No. 3,506,007, and relating to an improved epidural catheter needle for the introduction and placement of a catheter and the administration of epidural anesthesia or drainage.

A practical embodiment of the present invention is illustrated in the accompanying drawing to which the description refers.

The pre-formed catheter is made by providing a mandrel 1 of a suitable material such as stainless steel, of uniform diameter and bent smoothly near one end through an angle of about 90°. A piece of "Teflon" TFE tubing 2, having an I.D. slightly larger than the diameter of the mandrel, is threaded on the mandrel and extends a short distance beyond the bent end thereof as indicated at 3, the clearance between the mandrel and tube being designated 4.

Figure 1:
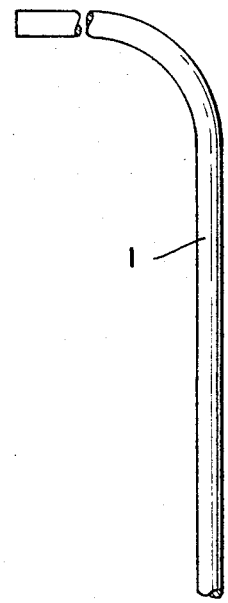
FIG. 1 represents an elevation of a mandrel.
Figure 2:
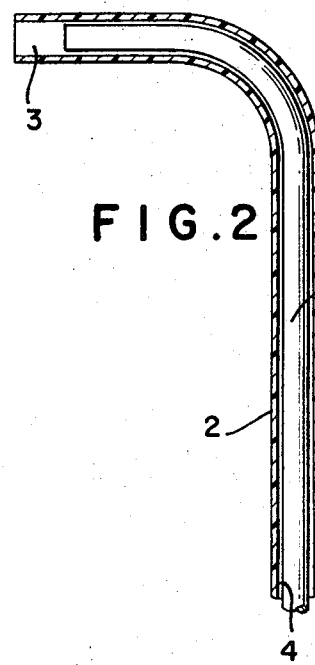
FIG. 2 represents an axial sectional view of the mandrel with plastic tube thereon.
Figure 3:
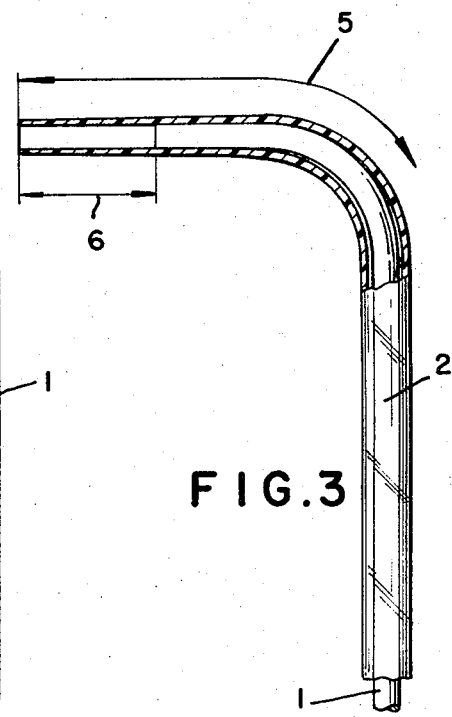
FIG. 3 represents an axial sectional view as in FIG. 2 with the tube end heated and stretched.

The tube and mandrel are then heated above the transition temperature of "Teflon" TFE, which is approximately 620° F., causing the tubing to become clear, and a pulling force is applied to the end 3 of the tube. As the tubing is drawn (FIG. 3) it is attenuated and its diameter is reduced, in the zone 5, to that of the mandrel, at which point the assembly is quenched in water, setting a bend in the tube which, upon removal from the mandrel, stabilizes at about 60°.

Figure 4:
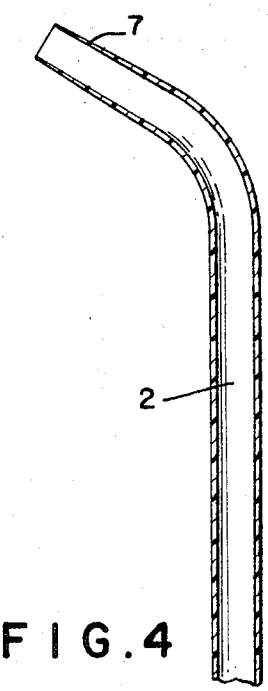
FIG. 4 represents an axial sectional view of the completed catheter.

The tube 2 is removed from the mandrel 1, placed on a straight mandrel (not shown), trimmed to remove excess material 6 at the tip, and externally finished by grinding to form the smooth taper or bevel 7 (FIG. 4).

For epidural administrations a catheter made of "Teflon" TFE is preferred in order to decrease frictional drag through the body tissue and ligaments. Other polymeric materials exhibiting similar self-lubricating characteristics include the organopolysiloxanes and linear polyethylene.

Figure 5:
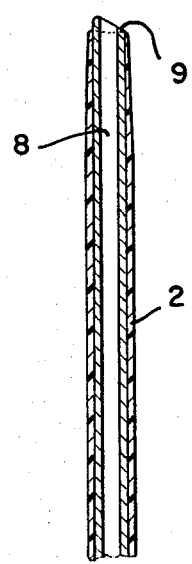
FIG. 5 represents an elevation of the catheter on a needle, ready for insertion.
Figure 6:
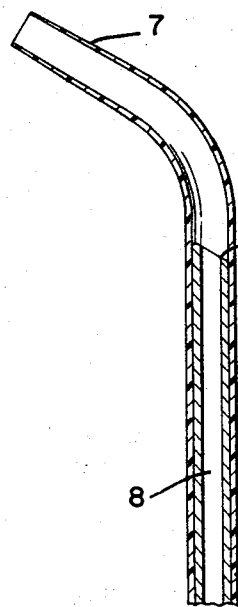
FIG. 6 represents an elevation of the catheter in the position assumed after insertion and partial withdrawal of the needle.

In use, a needle 8 having a slightly rounded beveled end 9 (the bevel being at an angle of no less than 30° or greater than 90° from the needle axis) is inserted through the catheter to a position where it projects slightly beyond the tapered end of the catheter, as shown in FIG. 5. The catheter and needle are held accurately in this relationship as they are introduced, for instance, through the interspinous ligaments into the epidural space, the relatively blunt end of the needle minimizing danger of puncturing the dura. When the catheter has been thus introduced into said space, and its proper orientation determined by a suitable indexing mark (not shown), the needle can be withdrawn, first to the position shown in FIG. 6 where the catheter has returned to its pre-set curvature, and then completely to leave the catheter lumen open and unimpeded for administration or drainage, as required.

The bend in the catheter end ensures that flow through it, in either direction, cannot be blocked by contact with the dura.

What we claim is:

1. The method of making a preformed curved plastic catheter which includes the steps of providing a rigid curved mandrel having a curvature greater than that desired in the final product, passing a length of polytetrafluoroethylene tubing over said mandrel whereby the tubing is deformed to the shape of the mandrel, heating the assembled mandrel and tubing to a temperature above approximately 620° F., causing the tubing to become clear, rapidly cooling the heated assembly to set the tubing in a curved shape, separating the tubing from the mandrel and permitting the tubing to stabilize at the desired curvature.

2. The method according to claim 1 wherein the heating is followed by drawing and stretching a portion of the tubing adjacent an end of said tubing, whereby the diameter of the stretched portion is reduced.

3. The method according to claim 2 which includes trimming off an end portion of the tubing adjacent the stretched portion.

4. The method according to claim 3 which includes beveling the end portion of the tubing adjacent the stretched portion.

5. The method according to claim 4 wherein the beveling is effected by placing the curved tube on a straight mandrel and grinding the portion to be beveled.

* * * * *